United States Patent
Lu et al.

(10) Patent No.: US 7,068,892 B1
(45) Date of Patent: Jun. 27, 2006

(54) PASSIVELY ALIGNED OPTICAL-ELECTRICAL INTERFACE

(75) Inventors: Daoqiang Lu, Chandler, AZ (US); Henning Braunisch, Chandler, AZ (US); Edris M. Mohammed, Hillsboro, OR (US); Ian Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/096,504

(22) Filed: Mar. 29, 2005

(51) Int. Cl.
*G02B 6/42* (2006.01)
(52) U.S. Cl. .......................... 385/52; 385/88
(58) Field of Classification Search ................ 385/46, 385/49, 52, 78, 88–94
See application file for complete search history.

(56) References Cited

U.S. PATENT DOCUMENTS

| 4,943,136 | A | * | 7/1990 | Popoff ..................... 385/46 |
| 4,944,568 | A | * | 7/1990 | Danbach et al. ............ 385/88 |
| 5,359,686 | A | * | 10/1994 | Galloway et al. ........... 385/49 |
| 6,834,133 | B1 | | 12/2004 | Towle et al. |
| 2004/0126058 | A1 | | 7/2004 | Lu et al. |
| 2004/0126064 | A1 | | 7/2004 | Vandentop et al. |
| 2004/0190831 | A1 | | 9/2004 | Lu et al. |
| 2005/0036728 | A1 | | 2/2005 | Braunisch |

OTHER PUBLICATIONS

Mohammed, E. M. et al., "Optical I/O technology for digital VLSI," Proceedings of SPIE, vol. 5358, (2004), pp. 60-70.
Towle, S. et al., "Methods and Apparatus to Optically Couple an Optoelectronic Chip to a Waveguide," U.S. Appl. No. 10/664,475, filed Sep. 17, 2003.
Braunisch, H. et al., "Waveguide Coupling Mechanism," U.S. Appl. No. 10/934,858, filed Sep. 3, 2004.
Lu, D. et al., "Optical Package," U.S. Appl. No. 10/954,903, filed Sep. 30, 2004.
Towle, S. et al., "On-Substrate Microlens to Couple an Off-Substrate Light Emitter and/or Receiver with an On-Substrate Optical Device," U.S. Appl. No. 10/955,553, filed Sep. 30, 2004.

(Continued)

*Primary Examiner*—Phan Palmer
(74) *Attorney, Agent, or Firm*—Blakely, Sokoloff, Taylor & Zafman LLP (57) ABSTRACT

An optical-electrical interface includes an alignment interface and an optoelectronic die. The alignment interface is mounted to a substrate and includes a waveguide port to receive an external waveguide from a first side. The alignment interface includes a conductor disposed on a second side of the alignment interface to couple to a conductor on the substrate. The optoelectronic die is mounted to the second side of the alignment interface. The optoelectronic die includes an electrical port coupled to the conductor disposed on the alignment interface, an optoelectronic device coupled to the electrical port and an optical port aligned to optically couple the optoelectronic device to the external waveguide through the alignment interface.

21 Claims, 7 Drawing Sheets

OTHER PUBLICATIONS

Towle, S. et al., "Manufacturable Connectorization Process for Optical Chip-to-Chip Interconnects," U.S. Appl. No. 10/955,897, filed Sep. 30, 2004.

Mohammed, E., "Surface Mount (SMT) Connector for VCSEL and Photodiode Arrays," U.S. Appl. No. 10/971,234, filed Oct. 22, 2004.

U.S. Appl. No. 11/124,033, filed May 6, 2005.

* cited by examiner

PASSIVELY ALIGNED OPTICAL-ELECTRICAL INTERFACE

TECHNICAL FIELD

This disclosure relates generally to optical-electrical interfaces, and in particular but not exclusively, relates to passively aligned optical-electrical interfaces.

BACKGROUND INFORMATION

As the power of processing devices exponentially increases, high bandwidth communication links interconnecting these processing devices are increasingly important. Optical media or carriers are capable of providing such high bandwidth communication links. To utilize optical carriers, optical-electrical interfaces are needed to interface the optical realm of the carrier with the electrical realm of the processing devices.

One type of optical-electrical interface uses a waveguide embedded within a substrate having a multi-terminal ("MT") connector to form a make and break connection with an external waveguide. The substrate may support a variety of electrical devices that interface with the embedded waveguide via an optoelectronic die. The optoelectronic die is electrically coupled to the substrate while at the same time carefully positioned to optically align with micro-mirrors integrated into the embedded waveguide. These optical-electrical interfaces are generally manufactured using distinct components, which are fabricated separately, and cumbersomely assembled.

Known optical-electrical interfaces, such as the one described above, use active alignment techniques to obtain the necessary alignment precision. Active alignment entails manually aligning the optoelectronic die with the embedded waveguide while the optical-electrical interface is stimulated and observed with a photodetector or microscope for sufficient alignment. Manual active alignment is people intensive and does not lend itself well to high volume manufacturing ("HVM").

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, method of high-volume manufacture, and system for implementing a passively aligned optical-electrical interface are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
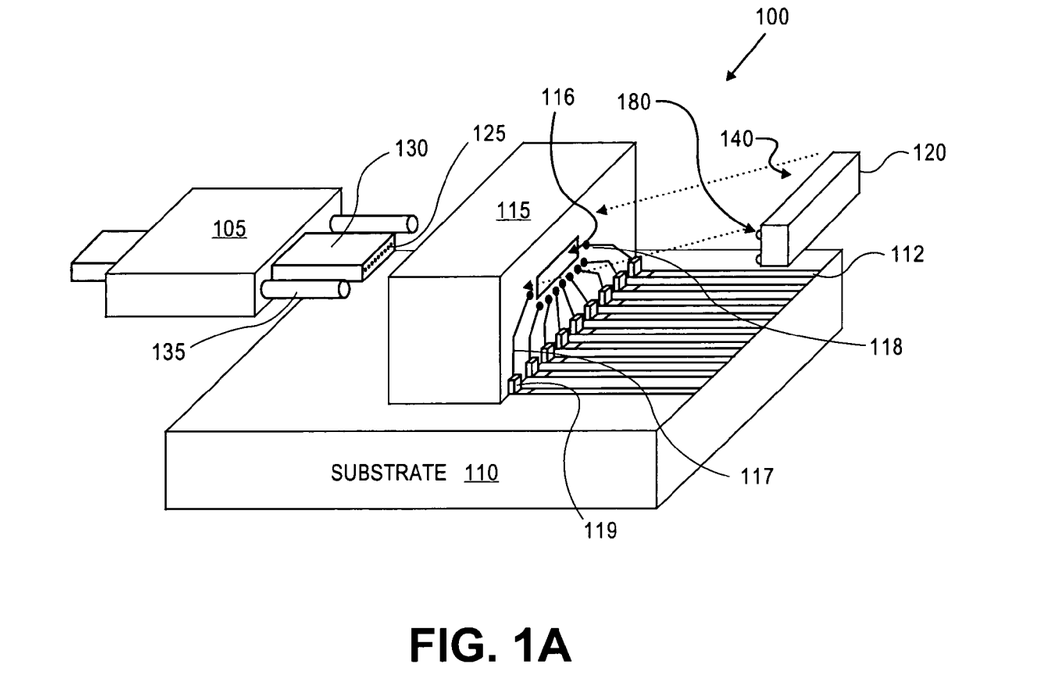
FIG. 1A is a perspective view diagram illustrating an optical-electrical interface capable of passively aligning an optoelectronic die with an external waveguide, in accordance with an embodiment of the invention.

FIG. 1A is a perspective view diagram illustrating an optical-electrical interface ("OEI") 100 for coupling to an external waveguide connector 105 and a substrate 110, in accordance with an embodiment of the invention. The illustrated embodiment of OEI 100 includes an alignment interface 115 and an optoelectronic (OE) die 120. Substrate 110 includes conductor traces 112 disposed on its surface and may include various logic chips, such as complementary metal oxide semiconductor ("CMOS") chips and the like (not illustrated), electrically connected to conductor traces 112. Alignment interface 115 includes a waveguide port or cavity 116, conductor traces 117, and conductor pads 118 and 119. The illustrated embodiment of external waveguide connector 105 includes one or more external waveguides 125, a male coupler 130, and alignment pins 135.

Figure 1B:
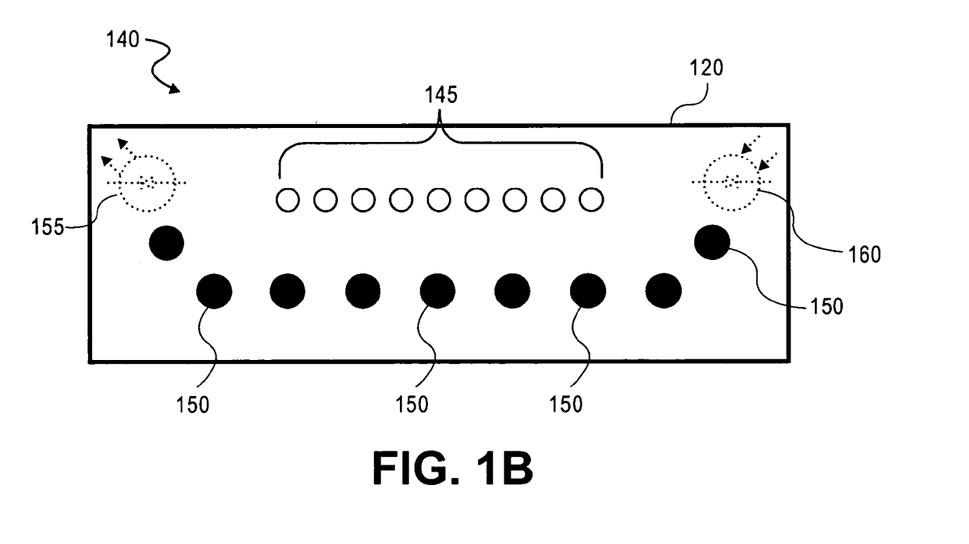
FIG. 1B is a block diagram illustrating a backside view of an optoelectronic interface, in accordance with an embodiment of the invention.

FIG. 1B is a block diagram illustrating a backside 140 of OE die 120, in accordance with an embodiment of the invention. The illustrated embodiment of backside 140 includes an array of optical ports 145 and electrical ports 150 (only a portion of which are labeled). OE die 120 is an interface point for converting signals between the electrical and optical realms. As such, one or more optical sources 155 and/or one or more optical detectors 160 may be integrated within OE die 120.

When external waveguide connector 105 is inserted into OEI 100, the components of OEI 100 interact as follows. Male coupler 130 is shaped to securely mate with cavity 116 of alignment interface 115. In one embodiment, cavity 116 and male coupler 130 mate to passively align external waveguides 125 housed within male coupler 130 with optical ports 145 positioned on backside 140 of OE die 120. Insertion of male connector 130 into cavity 116 passively aligns external waveguides 125 to butt connect with each of optical ports 145. In the illustrated embodiment, external waveguide connector 105 further includes alignment pins 135, which mate with corresponding alignment holes (not illustrated) within alignment interface 115. Alignment pins 135 may be included for additional alignment functionality, higher precision alignment, and/or to add mechanical rigidity to the interconnection. Once connected, optical signals can be communicated between external waveguides 125 and OE die 120.

In one embodiment, OE die 120 is a semiconductor material, such as silicon, gallium arsenide, other III–V semiconductors, or the like. OE die 120 includes integrated optoelectronic devices, such as optical source 155 and optical detector 160. One or more optical sources 155 may be electrically coupled and responsive to a portion of electrical ports 150 to generate optical signals for launching into external waveguides 125 via optical ports 145. In turn, electrical ports are coupled to conductor pads 118 via electrical connections, such as solder bumps, other surface mount connections, or the like. Conductor pads 118 couple to conductor traces 117, conductor pads 119, and conductor traces 112, in turn, for coupling electrical signals from external electrical devices mounted on substrate 110. While a portion of conductor traces 112 may deliver electrical signals into OE die 120 for modulating optical sources 155, a portion may also deliver power for driving optical sources 155.

One or more optical detectors 160 may also be integrated into OE die 120 for receiving optical signals from external waveguides 125 and for generating electrical signals in response thereto. Optical detectors 160 may be coupled to another portion of electrical ports 150 to deliver the generated electrical signals to the external electronic devices disposed on substrate 110 via conductor traces 117 and 112. Accordingly, a portion of conductor traces 112 may carry electrical signals from optical detectors 160 or deliver power into OE die 120 for operating optical detectors 160.

In one embodiment, two separate OE dies 120 are mounted to the side of alignment interface 115, one OE die including optical sources 155 and the other OE die including optical detectors 160. Two distinct OE dies 120 enables optical sources 155 and optical detectors 160 to be implemented in different semiconductor materials (e.g., silicon based optical detectors 160 and gallium arsenide based optical sources 155) and thereby tailored for specific use cases and manufacturing processes. Alternatively, OEI 100 may be implemented as just an optical-to-electrical receiver including only one or more optical detectors 160 or implemented as just an electrical-to-optical transmitter including only one or more optical sources 155. Otherwise, OEI 100 may be a transceiver including both optical sources 155 and optical detectors 160 integrated within a single OE die 120 or multiple OE dies 120. In yet other embodiments, OEI 100 may further include additional dies such as laser driver chips, transimpedance amplifiers ("TIAs"), and/or limiting amplifier ("LIA") chips, interconnected with OE die 120 and substrate 110 via appropriately routed conductor traces 117 and 112.

Optical sources 155 may be made of any light producing device, including semiconductor lasers, direct electrically modulated lasers, lasers with integrated modulators, quantum well or quantum dot devices such as vertical cavity surface emitting lasers ("VCSELs"), edge emitting lasers, and the like. Optical detectors 160 may be made of any light responsive device, including semiconductor optical detectors, such as photodiodes, and the like.

Substrate 110 may be a circuit board, motherboard, a circuit package, and the like. Substrate 110 may be formed of any rigid material capable of supporting conductor traces 112 and alignment interface 115 thereon. For example, substrate 110 may be made of dielectric materials, organic materials, semiconductor materials, silicon, gallium arsenide, and the like.

External waveguide connector 105 may include any type of optical connector for housing one or more external waveguides 125 therein. In one embodiment, external waveguide connector 105 is a multi-terminal ("MT") connector capable of "make and brake" connections with alignment interface 115. Alignment interface 115 may be fabricated of any rigid material capable of supporting external waveguide connector 105 with sufficient strength and precision. In one embodiment, alignment interface 115 is formed of a high precision plastic, for example, injection molded plastic.

Figure 2:
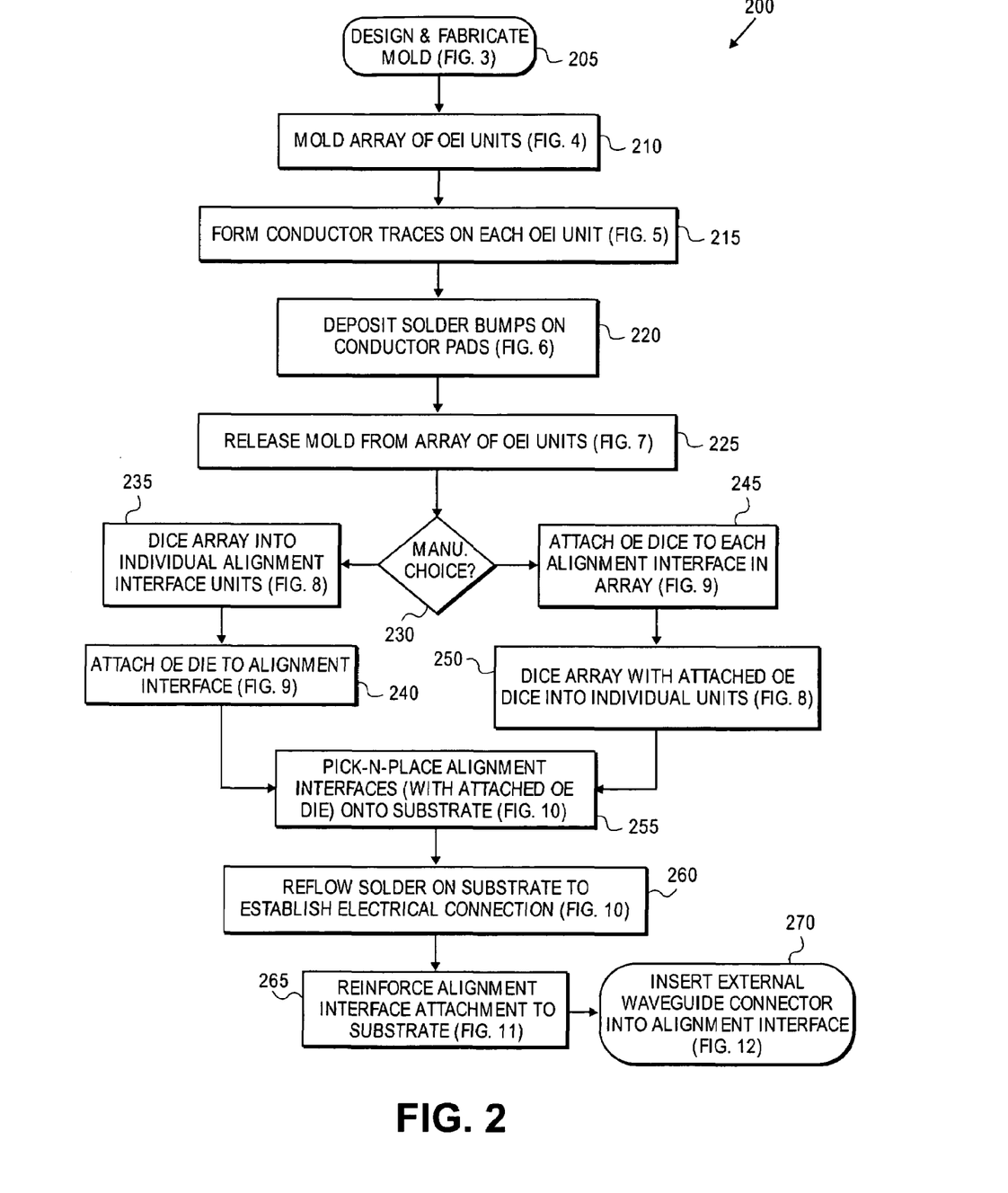
FIG. 2 is a flow chart illustrating a process for high-volume manufacturing of optical-electrical interfaces, in accordance with an embodiment of the invention.

FIG. 2 is a flow chart illustrating a process 200 for high-volume manufacturing ("HVM") of OEIs 100, in accordance with an embodiment of the invention. Process 200 is described below with reference to FIGS. 3–12. The order in which some or all of the process blocks below appear in process 200 should not be deemed limiting. Rather, one of ordinary skill in the art having the benefit of the present disclosure will understand that some of the process blocks may be executed in a variety of orders not illustrated, or even skipped all together.

Figure 3:
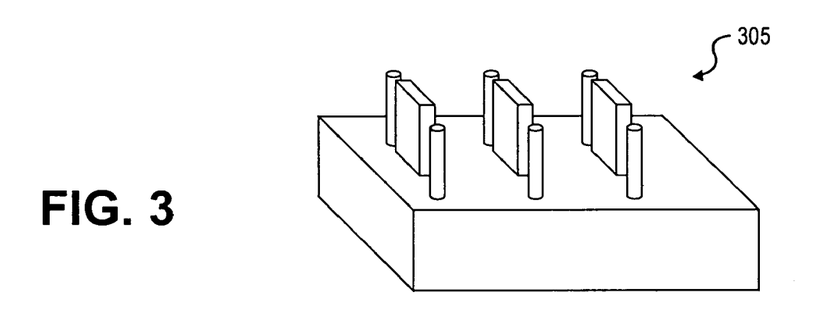
FIG. 3 illustrates a mold used to form an array of alignment interfaces to manufacture an optical-electrical interface, in accordance with an embodiment of the invention.
Figure 4:
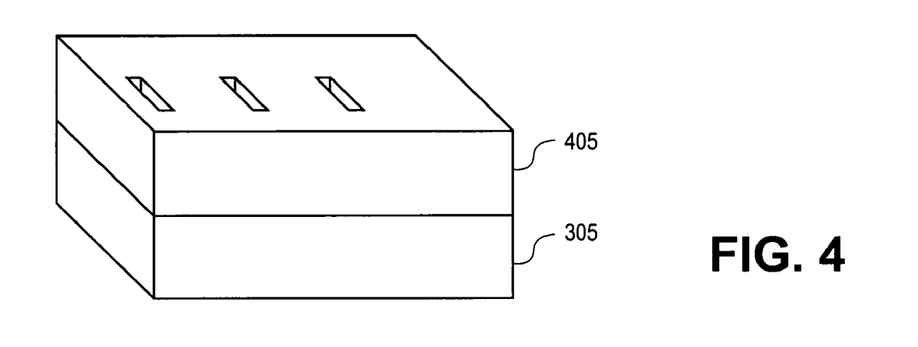
FIG. 4 illustrates an array of alignment interfaces formed in a mold during manufacture of an optical-electrical interface, in accordance with an embodiment of the invention.

In a process block 205 (FIG. 3), a mold 305 is designed and manufactured for fabricating an array 405 of alignment interfaces 115. Mold 305 may be designed to fabricate anywhere from one to a plurality (e.g., hundreds) of individual alignment interfaces 115 in a single fabrication cycle. Mold 305 may be designed and built using standard techniques known in the art of HVM. In a process block 210 (FIG. 4), mold 305 is used to fabricate array 405. In one embodiment, array 405 is formed by precision molding using plastic injection techniques. For example, array 405 may be formed using plastic injection techniques having tolerances of 2–3 μm. These tolerances are well within tolerances acceptable to align optical ports 145 with external waveguides 125. For example, in an embodiment where external waveguides 125 have core diameters of 50 μm, optical sources 155 have optical apertures of 10 μm, and optical detectors have apertures of 60 μm, tolerances of 2–3 μm for fabricating alignment interface 115 is acceptable to obtain adequate optical alignment for launching and receiving optical signals to/from external waveguides 125.

Figure 5:
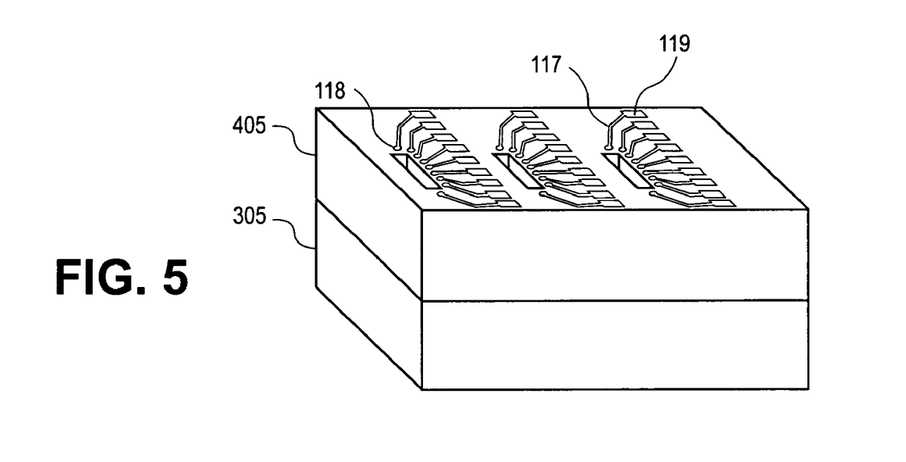
FIG. 5 illustrates formation of conductor traces and conductor pads on an array of alignment interfaces during manufacture of an optical-electrical interface, in accordance with an embodiment of the invention.

Once array 405 is formed, conductor traces 117 and conductor pads 118 and 119 (only a portion of which are labeled) are formed on the surface of array 405 (process block 215, FIG. 5). Sets of conductor traces 117 and conductor pads 118 and 119 are formed for each alignment interface 115 of array 405. For example, each alignment interface 115 may include 20 to 50 conductor traces 117 and corresponding conductor pads 118 and 119 for coupling to electrical ports 150 of OE die 120. However, it should be appreciated that the number of conductor traces 117 and corresponding conductor pads 118 and 119 may be varied to provide any number of electrical signals and power connections to OE die 120. In one embodiment, conductor traces 117 and conductor pads 118 and 119 are formed using photolithography.

In general, it is desirable to control the characteristic impedance of conductor traces 117 to match a predefined value. Impedance control can be achieved in planar transmission line design using a single metallization layer and co-planar waveguide ("CPW") technology. Transmission lines requiring multiple metallization layers such as microstrips and strip lines can be realized using standard high-density interconnect ("HDI") buildup processes, for example, using an Ajinomoto Buildup Film ("ABF") and laser drilling/plating for via formation. Furthermore, it may be beneficial to add a solder resist layer with solder resist openings at the locations of conductor pads 118 and 119.

As can be seen from FIG. 5, conductor pads 118 are formed with a finer separation pitch than conductor pads 119. Conductor traces 117 fanout from conductor pads 118 to conductor pads 119 to transition from the fine-pitch integration of OE die 120 to the coarse-pitch conductor traces 112 of substrate 110. Standard technology conductor traces 112 may have widths and separation pitches constrained by impedance matching, cross-talk, parasitic circuit elements, and linear resistances. For example, conductor pads 118 may have a separation pitch of 125 μm, while conductor pads 119 may have a separation pitch of 200–500 μm.

Figure 6:
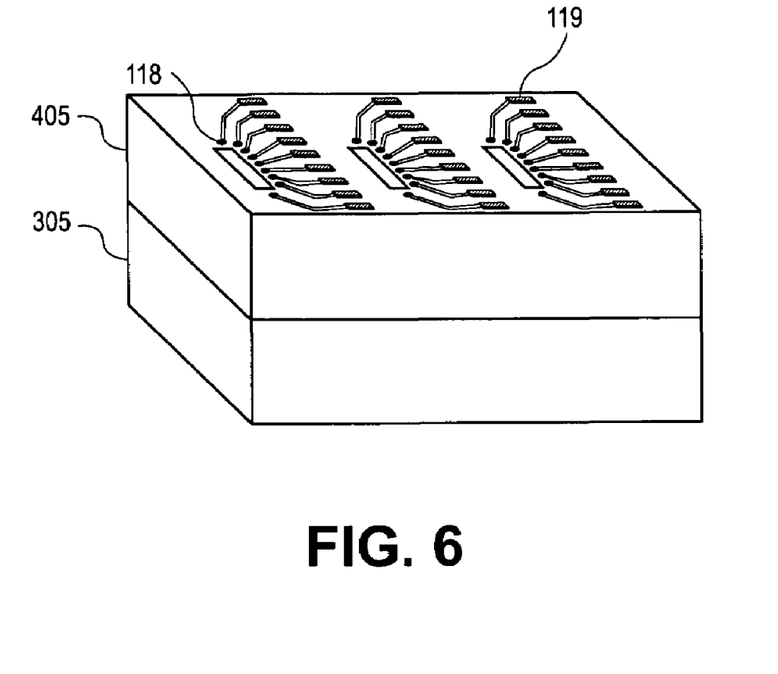
FIG. 6 illustrates placement of solder on conductor pads during manufacture of an optical-electrical interface, in accordance with an embodiment of the invention.

In a process block 220 (FIG. 6), solder is placed on conductor pads 118 and 119. In one embodiment, solder bumps are formed on conductor pads 118 and solder domes are formed on conductor pads 119.

Figure 7:
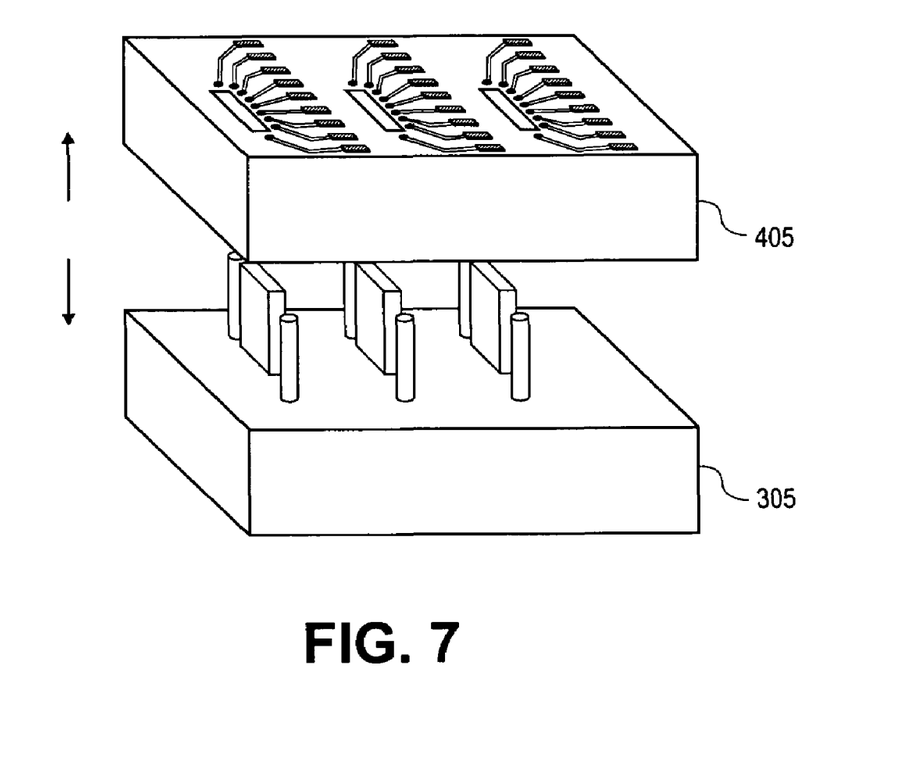
FIG. 7 illustrates separation of an array of alignment interfaces from a mold during manufacture of an optical-electrical interface, in accordance with an embodiment of the invention.
Figure 8:
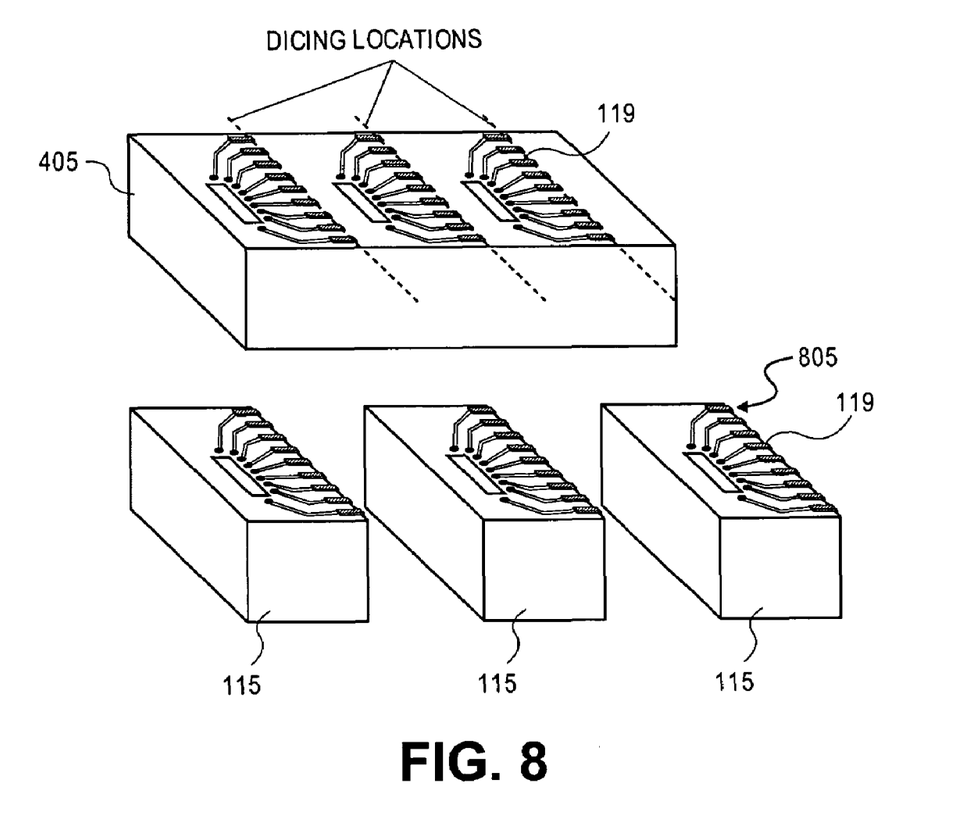
FIG. 8 illustrates dicing an array of alignment interfaces into individual alignment interfaces during manufacture of an optical-electrical interface, in accordance with an embodiment of the invention.
Figure 9:
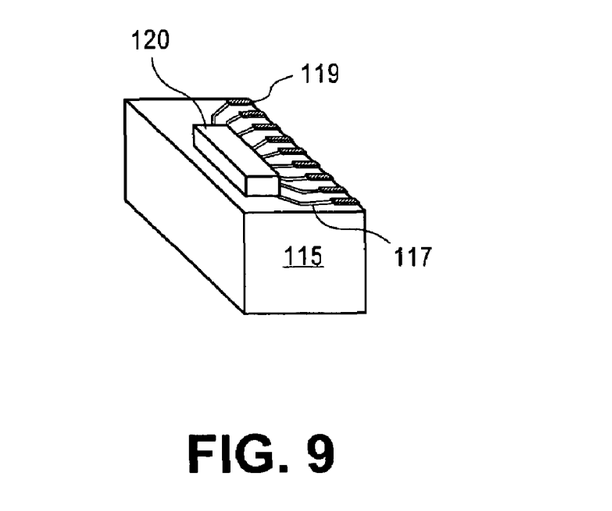
FIG. 9 illustrates mounting an optoelectronic die to an alignment interface during manufacture of an optical-electrical interface, in accordance with an embodiment of the invention.

In a process block 225 (FIG. 7), array 405 is released from mold 305. Once array 405 is freed from mold 305, a manufacturing choice (decision block 230) may be made. This choice includes whether to first dice array 405 into individual alignment interfaces 115 (process block 235, FIG. 8) and then attach OE die 120 to each individual alignment interface 115 (process block 240, FIG. 9) or whether to first attach an OE die 120 to each alignment interface 115 in array 405 (process block 245, FIG. 9) and then dice the combined pieces (process block 250, FIG. 8).

In process blocks 235 or 250 (FIG. 8), array 405 is diced along dicing locations which pass through conductor pads 119 having solder placed thereon. By dicing through conductor pads 119 after solder has been laid down, a solder straight edge 805 is cut through the hardened solder. Solder straight edge 805 provides a flat surface for butt connecting each conductor pad 119 to corresponding conductor traces 112 on substrate 110 (described below in connection with process block 260).

In process blocks 240 and 245 (FIG. 9), OE die 120 is mounted to alignment interface 115. In one embodiment, OE die 120 is mounted by depositing solder bumps 180 (see FIG. 1A) on electrical ports 150 of OE die 120 and reflowing the solder bumps 180 when OE die 120 is aligned and placed in contact with conductor pads 118 of alignment interface 115. Although the separation pitch between conductor pads 118 is considerably smaller than that of conductor pads 119, surface tension created when solder bumps 180 and/or solder deposited on conductor pads 118 are reflowed passively encourages alignment between electrical ports 150 on backside 140 of OE die 120 and conductor pads 118. The surface tension acts to pull the two conducting surfaces into position. Since backside 140 of OE die 120 and conductor pads 118 are formed with highly accurate lithography techniques, alignment of electrical ports 150 with conductor pads 118 results in accurate positioning of optical ports 145 such that the optical apertures of optical ports 145 will align with external waveguides 125 when external waveguide connector 105 is mated with cavity 116.

Figure 10:
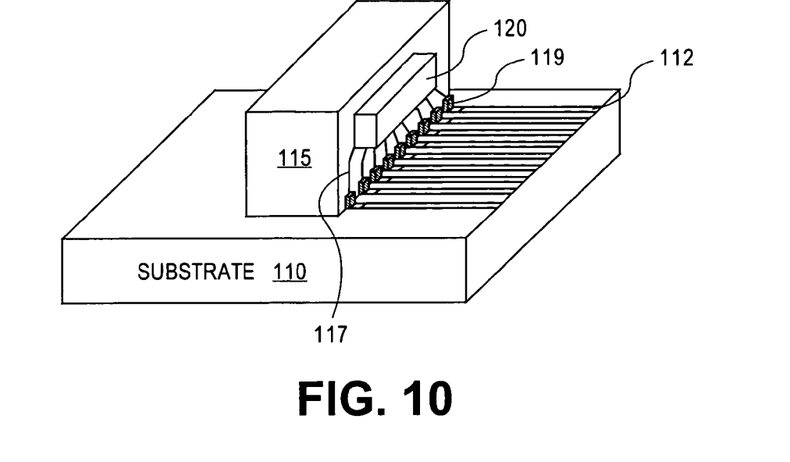
FIG. 10 illustrates mounting an alignment interface to a substrate during manufacture of an optical-electrical interface, in accordance with an embodiment of the invention.

Once array 405 has been diced and OE dice 120 mounted to the individual alignment interfaces 115, the combined unit (OEI 100) can be positioned onto substrate 110 using pick-n-place techniques or the like (process block 255, FIG. 10). Since the separation pitch between conductor traces 112 is larger than that of conductor pads 118, the precision need to pick-n-place alignment interface 115 and OE die 120 onto substrate 110 is less stringent. In a process block 260, the solder applied to conductor pads 119 is reflowed to establish an electrical connection between conductor traces 117 and 112. Again, the surface tension created by the liquefied solder acts to encourage alignment between the conductor traces. In one embodiment, solder paste may also be pre-applied to conductor traces 112 on substrate 110 prior to pick-n-place and reflow.

Figure 11:
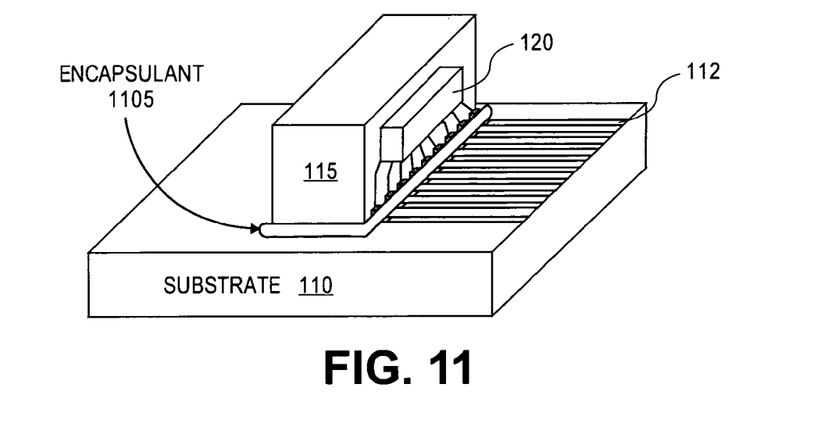
FIG. 11 illustrates reinforcement of an alignment interface to a substrate during manufacture of an optical-electrical interface, in accordance with an embodiment of the invention.

In a process block 265 (FIG. 11), the surface mount joint between alignment interface 115 and substrate 110 is reinforced by application of an encapsulant 1105. Encapsulant 1105 may include any adhesive capable of rigidly securing alignment interface 115 to substrate 110 after curing. Encapsulant 1105 may be cured by heat, light, UV radiant energy, or other techniques. Once cured, encapsulant 1105 should be capable of withstanding the stresses associated with repeated make-and-break attachment of external waveguide connector 105 to alignment interface 115. In one embodiment, encapsulant 1105 is an epoxy-based liquid adhesive applied around the base of alignment interface 115.

Figure 12:
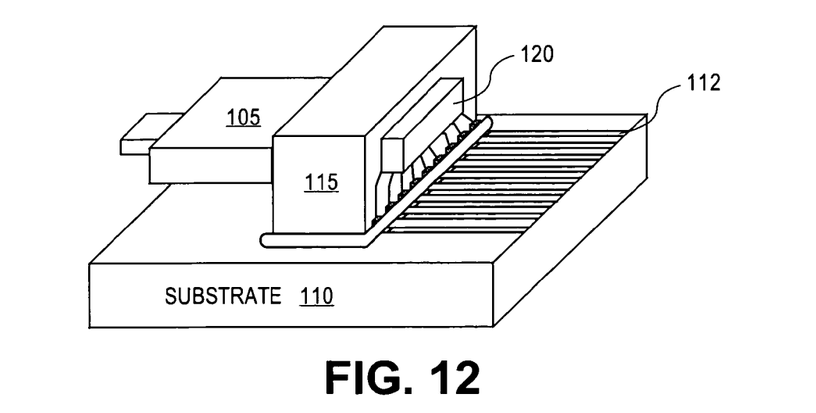
FIG. 12 illustrates attachment of an external waveguide connector to an optical-electrical interface, in accordance with an embodiment of the invention.

Finally, in a process block 270 (FIG. 12), external waveguide connector 105 may be inserted into cavity 116 to establish an optically butt coupled connection between external waveguides 125 and optical ports 145. When external waveguide connector 105 is inserted, the mating between cavity 116 and male coupler 130 and/or between alignment pins 135 and the alignment holes passively aligns optical ports 145 and external waveguides 125. It should be appreciated that the make-and-break connection established in process block 270 may be repeated many times, as needed in the field, and does not require time consuming active alignment.

Figure 13:
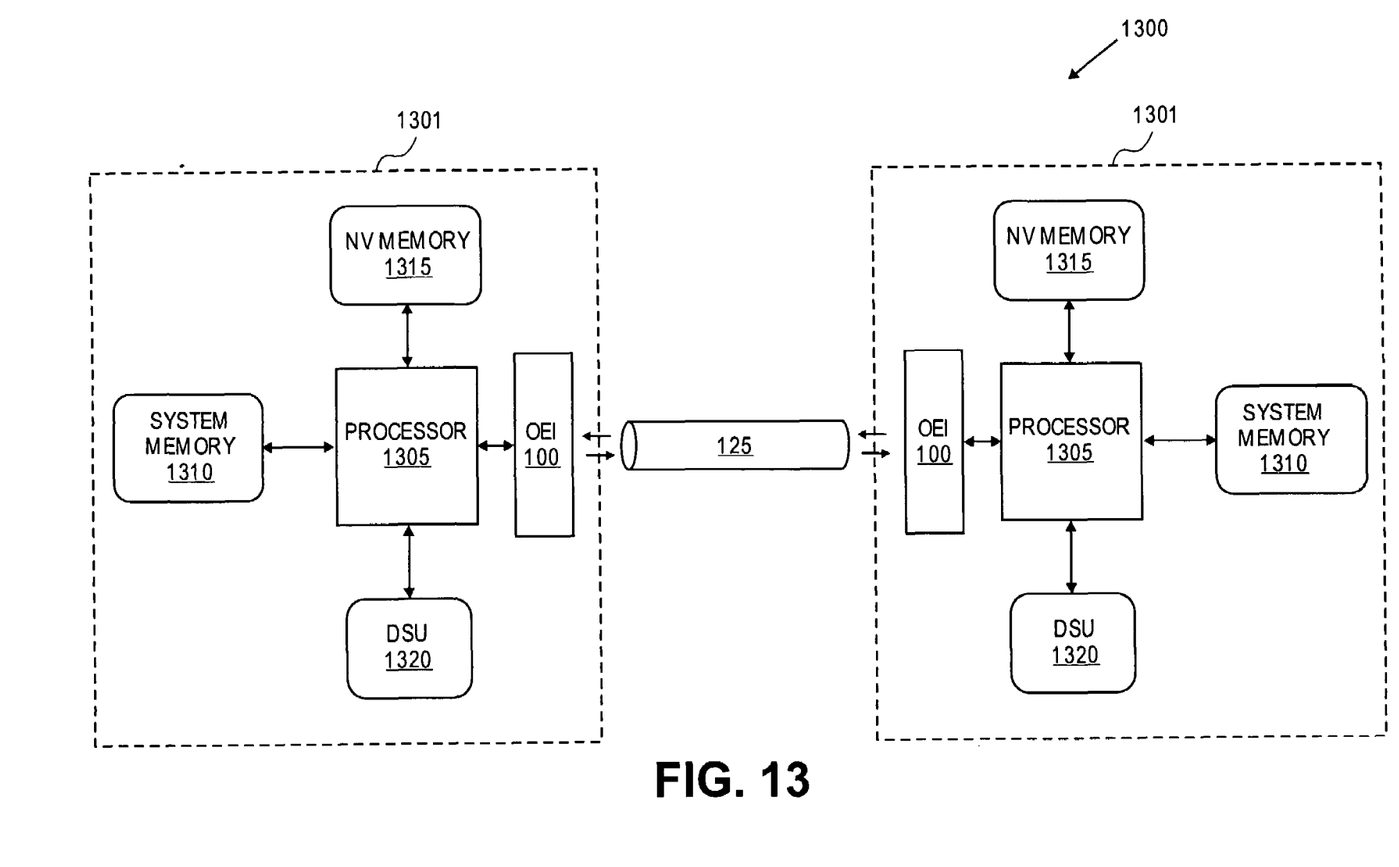
FIG. 13 is a block diagram illustrating a demonstrative system in which embodiments of the invention are implemented.

FIG. 13 is a block diagram illustrating a demonstrative system 1300 in which embodiments of the invention are implemented. System 1300 includes processing devices 1301 communicatively coupled via external waveguides 125. Processing devices 1301 may represent distinct computing systems (e.g., desktop computers, notebook computers, workstations, handheld computers, servers, processing blades, or the like). Alternatively, processing devices 1301 may include only a subset of the illustrated subcomponents and therefore represent circuit boards with electronic devices mounted thereon, microchips, or various other integrated circuits. In general, OEIs 100 may provide chip-to-chip, board-to-board, rack-to-rack, or system-to-system intercommunications between processing devices 1301 over external waveguide 125 (e.g., multi-strand fiber optic cable or the like).

The illustrated embodiments of processing devices 1301 each include one or more processors (or central processing units) 1305, system memory 1310, nonvolatile ("NV") memory 1315, a data storage unit ("DSU") 1320, and OEI 100. Processor(s) 1305 is/are communicatively coupled to system memory 1310, NV memory 1315, DSU 1320, and OEI 100 to send and to receive instructions or data thereto/therefrom. In one embodiment, NV memory 1315 is a flash memory device. In other embodiments, NV memory 1315 includes any one of read only memory ("ROM"), programmable ROM, erasable programmable ROM ("EPROM"), electrically erasable programmable ROM ("EEPROM"), or the like. In one embodiment, system memory 1310 includes random access memory ("RAM"), such as dynamic RAM ("DRAM"), synchronous DRAM ("SDRAM"), double data rate SDRAM ("DDR SDRAM"), static RAM ("SRAM"), and the like. DSU 1320 represents any storage device for software data, applications, and/or operating systems, but will most typically be a nonvolatile storage device. DSU 1320 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a substrate including a first conductor;
    an alignment interface mounted to the substrate, the alignment interface including a waveguide port to receive an external waveguide from a first side, the alignment interface including a second conductor disposed on a second side of the alignment interface and coupled to the first conductor; and
    an optoelectronic die mounted to the second side of the alignment interface, the optoelectronic die including:
        a first electrical port coupled to the second conductor;
        an optoelectronic device coupled to the first electrical port; and
        a first optical port aligned to optically couple the optoelectronic device to the external waveguide through the alignment interface, when the external waveguide is inserted into the waveguide port.

2. The apparatus of claim 1, wherein the waveguide port comprises a cavity through the alignment interface and shaped to securely hold and passively align a multi-terminal connector housing at least two external waveguides, including the external waveguide.

3. The apparatus of claim 2, further comprising:
    a third conductor disposed on the substrate;
    a fourth conductor disposed on the alignment interface coupled to the third conductor; and
    a second optoelectronic die mounted to the alignment interface, the second optoelectronic die including:
        an electrical output port coupled to the fourth conductor;
        an optical detector coupled to the electrical output port; and
        an optical input port aligned to optically couple the optical detector to one of the external waveguides.

4. The apparatus of claim 2, wherein the optoelectronic device comprises an optical source, and further comprising:
    a third conductor disposed on the substrate;
    a fourth conductor disposed on the second side of the alignment interface coupled to the third conductor;
    a second electrical port disposed within the optoelectronic die and coupled to the fourth conductor;
    an optical detector disposed within the optoelectronic die and coupled to the second electrical port; and
    a second optical port disposed within the optoelectronic die and aligned to optically couple the optical detector to one of the external waveguides.

5. The apparatus of claim 1, wherein the substrate comprises a circuit board including an electrical device mounted thereon and electrically coupled to the first conductor.

6. The apparatus of claim 5, wherein the optoelectronic die is surface mounted to the alignment interface, the first electrical port is soldered to the second conductor, and the first conductor is soldered to the second conductor.

7. The apparatus of claim 6, wherein the alignment interface comprises a plastic housing and the optoelectronic die comprises a semiconductor die.

8. The apparatus of claim 1, wherein the alignment interface further includes an alignment hole configured to mate with an alignment pin of the external waveguide to passively align the external waveguide with the first optical port, when the external waveguide is connected to the alignment interface.

9. The apparatus of claim 1, wherein the alignment interface is surface mounted to the substrate and secured with an epoxy.

10. The apparatus of claim 1, further comprising an array of vertical cavity surface emitting lasers ("VCSELs") disposed within the optoelectronic die each having a corresponding optical port aligned to optically couple a corresponding one of the VCSELs to a corresponding one of an array of external waveguides.

11. A method of manufacturing an optical-electrical interface, comprising:
    forming an array of alignment interfaces in a mold, each of the alignment interfaces formed with a cavity to receive and to passively align an external waveguide connector;
    forming conductor pads coupled to first conductor traces on the surface of the array of alignment interfaces for each of the alignment interfaces;
    dicing the array of alignment interfaces into individual alignment interfaces; and
    mounting an optoelectronic die to one of the alignment interfaces, the optoelectronic die including electrical ports, optical ports, and an optical source responsive to at least one of the electrical ports, and optically coupled to one of the optical ports.

12. The method of claim 11, further comprising aligning the optoelectronic die over the cavity to position the optical ports to optically couple through the cavity to external waveguides of the external waveguide connector, when the external waveguide connector is coupled to the one of the alignment interfaces.

13. The method of claim 12, wherein mounting the optoelectronic die to the one of the alignment interfaces, includes:
applying solder to the conductor pads;
positioning the optoelectronic die to overlay a first portion of the conductor pads for the one of the alignment interfaces proximate to the cavity of the one of the alignment interfaces; and
reflowing the solder applied to the first portion of the conductor pads to electrically couple the first portion of the conductor pads to the electrical ports.

14. The method of claim 13, wherein dicing the array of alignment interfaces comprises dicing the array of alignment interfaces at dicing locations passing through a second portion of the conductor pads for the one of the alignment interfaces having the solder applied thereto, to form a solder straight edge on each of the second portion of the conductor pads.

15. The method of claim 14, further comprising:
positioning the one of the alignment interfaces onto a substrate such that the solder straight edge on each of the second portion of the conductor pads abuts corresponding second conductor traces on the substrate; and
reflowing the solder applied to the second portion of the conductor pads to electrically couple the second portion of the conductor pads to the second conductor traces.

16. The method of claim 11, wherein the array of alignment interfaces comprises plastic and the optoelectronic die comprises semiconductor material.

17. The method of claim 11, wherein the optoelectronic die is mounted to the one of the alignment interfaces prior to dicing the array of alignment interfaces into individual alignment interfaces.

18. The method of claim 11, wherein forming conductor pads coupled to the first conductor traces on the surface of the array of alignment interfaces for each of the alignment interfaces comprises:
forming a first portion of the conductor pads proximate to the cavity;
forming the first conductor traces with a fanout pattern having first ends coupled to the first portion of the conductor pads; and
forming a second portion of the conductor pads coupled to distal ends of the first conductor traces, wherein the second portion of the conductor pads have a greater separation pitch than the first portion of the conductor pads.

19. A system, comprising:
first and second processor cores;
synchronous dynamic random access memory ("SDRAM") coupled to the first processor core;
waveguides; and
first and second optical-electrical interfaces ("OEIs") coupled to the waveguides, the first and second OEIs coupled to the first and second processor cores, respectively, each of the first and second OEIs comprising:
an alignment interface including a waveguide port to receive and to align the waveguides from a first side of the alignment interface and first conductors disposed on a second side of the alignment interface coupled to one of the processor cores; and
an optoelectronic die mounted to the second side of the alignment interface including electrical input and output ports coupled to the first conductors, an optical source coupled to the electrical input port, an optical detector coupled to the electrical output port, and optical output ports optically coupling the optical source and the optical detector with the waveguides through the alignment interface.

20. The system of claim 19, wherein the first processor core and the first OEI are mounted on a first circuit board and the second processor core and the second OEI are mounted on a second circuit board.

21. The system of claim 20, wherein the alignment interface is formed of plastic and the waveguide port comprises a cavity passing through the alignment interface, the cavity shaped to securely hold an external waveguide connector housing the waveguides and shaped to passively align the external waveguide connector when inserted into the cavity of the alignment interface.

* * * * *